United States Patent [19]
Kosaka

[11] Patent Number: 4,584,677
[45] Date of Patent: Apr. 22, 1986

[54] LOOP BACK CONTROL SYSTEM IN LOOP DATA TRANSMISSION SYSTEM

[75] Inventor: Takashi Kosaka, Tokyo, Japan

[73] Assignee: Tokyo Shibaura Denki Kabushiki Kaisha, Kawasaki, Japan

[21] Appl. No.: 591,326

[22] Filed: Mar. 19, 1984

[30] Foreign Application Priority Data

Mar. 22, 1983 [JP] Japan .................................. 58-47501

[51] Int. Cl.[4] ........................... H04J 1/16; H04J 3/14; H04J 3/00
[52] U.S. Cl. ........................................ 370/15; 370/88; 370/13
[58] Field of Search ....................... 370/88, 87, 15, 13, 370/16; 340/825.05

[56] References Cited

U.S. PATENT DOCUMENTS 3,519,750  7/1970  Beresin et al. ......................... 370/16
3,569,632  3/1971  Beresin et al. ......................... 370/16
4,380,061  4/1983  Mori et al. ............................. 370/88
4,390,984  6/1983  Sugiura et al. ........................ 370/88

Primary Examiner—Douglas W. Olms
Assistant Examiner—Wellington Chin
Attorney, Agent, or Firm—Cushman, Darby & Cushman

[57] ABSTRACT

In a loop back control system of a loop data transmission system which has a transmission circuit consisting of duplex loop transmission lines, a plurality of remote stations connected to the lines, a master station for monitoring these remote stations, and a loop back function, loop back command data having a common address for the remote stations is set in a destination address field, and first and second parameter fields, in which the addresses of two remote stations subjected to loop back control are set, are sent from the master station to the plurality of remote stations through the lines. Each remote station receives the loop back command data and detects whether or not the self station address is specified. If the self station address is specified, loop back control switching is performed.

3 Claims, 9 Drawing Figures

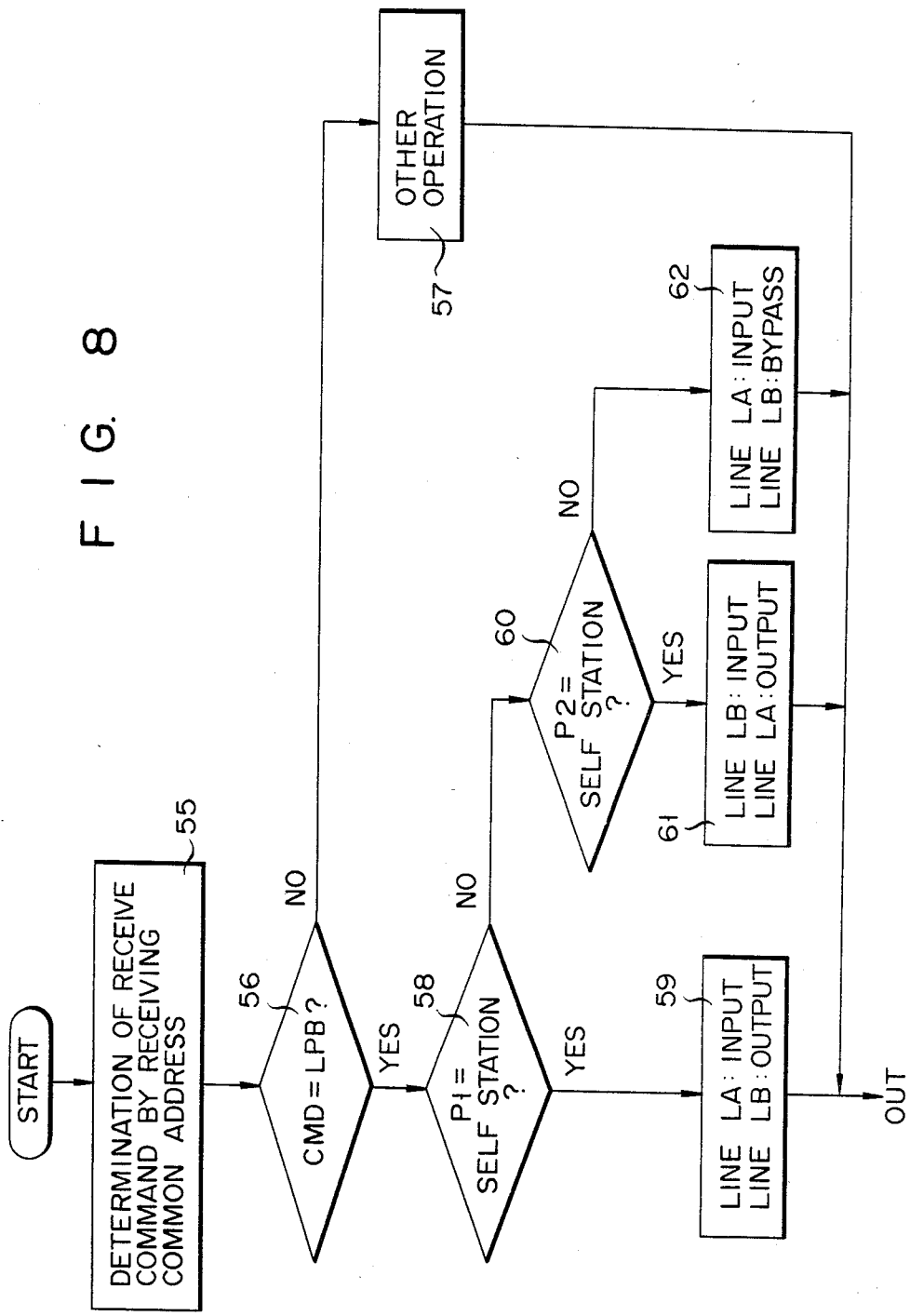

LOOP BACK CONTROL SYSTEM IN LOOP DATA TRANSMISSION SYSTEM

BACKGROUND OF THE INVENTION

The present invention relates to a loop back control system in a data way system having duplex loop transmission lines.

FIG. 1 shows an example of a conventional data way system having duplex loop transmission lines. Referring to FIG. 1, a line monitoring station (to be referred to as a master station hereinafter) 1 and data send stations (to be referred to as remote stations hereinafter) $2_1$, $2_2$, ... , and $2_n$ are looped through lines LA and LB. The master station 1 performs polling of the remote stations $2_1$, $2_2$, ..., and $2_n$ (i.e., in the order of the remote stations closer to the master station 1) in units of the remote stations. Devices (DIVs) 3 such as computers or terminal equipment are connected to the master station 1 and the remote stations $2_1$, $2_2$, ..., and $2_n$, respectively.

In a duplex loop transmission system of this type, system reliability can be improved, and expansion and modification of the system can be easily performed by a loop back function forming a return path at any station.

When cable trouble occurs as shown in FIG. 2, or the remote station $2_2$ breaks down as shown in FIG. 3, the loop back function is reconstructed under the control of the master station 1. In this case, the system is reconstructed such that the fault section is eliminated, as shown in FIG. 4.

Conventionally, in order to reconstruct the path of the data shown in FIG. 4, the master station 1 performs a message exchange with the remote stations $2_1$, $2_2$, ... , and $2_n$ beginning with the remote stations closer to the master station 1, in the units of the remote stations in accordance with polling. The master station 1 independently sends loop back commands to the remote stations $2_1$ and $2_2$, to perform loop back control, as shown in FIG. 4.

However, according to the conventional data reconstruction means of the type described above, line asynchronism occurs due to a time-lag between the commands sent to the remote stations $2_1$ and $2_n$, respectively. In addition to this disadvantage, system reconstruction takes a long time, so high-speed reconstruction cannot be performed, resulting in inconvenience.

SUMMARY OF THE INVENTION

It is an object of the present invention to provide a loop back control system in a data way system having duplex loop transmission lines, wherein a data path of a loop data transmission device can be arbitrarily reconstructed at high speed.

In order to achieve the above object of the present invention, there is provided a loop back control system in a loop data transmission system which has a master station looped with a plurality of remote stations through duplex transmission lines, and which has a loop back function for performing data exchange between terminal devices connected to said remote stations through said duplex transmission lines, comprising:

means for sending common loop back command data from said master station to said plurality of remote stations upon the occurrence of a fault, the common loop back command data having at least a destination address field of each of said plurality of remote stations and first and second parameter fields, the destination address field being provided with a common address for said plurality of remote stations, and the first and second parameter fields being provided with addresses for two stations which are subjected to loop back control;

loop back command data receiving means for receiving the loop back command data which is sent by said loop back command data sending means;

loop back command data determining means for determining the destination address and the first and second parameter fields of the loop back command data received by said loop back command data receiving means; and line connecting means for connecting said duplex transmission lines to construct a loop back path when said loop back command data determining means determines that a self or remote station address is detected in the first and second parameter fields while the common address is detected in the destination address field.

BRIEF DESCRIPTION OF THE DRAWINGS

Other objects and features of the present invention will be apparent from the following description of the accompanying drawings summarized below:

FIGS. 7A and 7B show data formats of exchange data in the embodiment of the present invention, in which FIG. 7A shows the data format of exchange data between stations, and FIG. 7B shows the data format when the master station sends a loop back command by common address access; and FIG. 8 is a flow chart for explaining the operation in accordance with the loop back command.

DETAILED DESCRIPTION OF THE PREFERRED EMBODIMENT

An embodiment of the present invention will be described hereinafter. The system configuration of the present invention is the same as that shown in FIG. 1.

Figure 5:
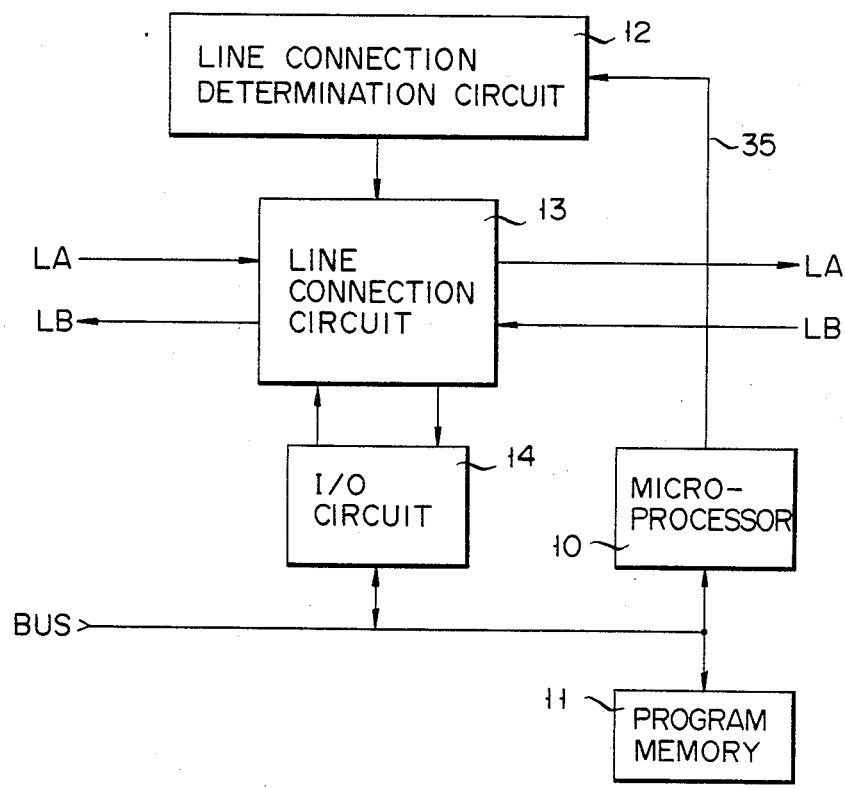
FIG. 5 is a block diagram showing the station configuration according to an embodiment of the present invention.

FIG. 5 is a block diagram showing the component elements of the station. In this embodiment, a master station and a plurality of remote stations are arranged in a common circuit shown in FIG. 5. Referring to FIG. 5, a microprocessor 10 controls data transmission (send and receive) or monitors data transmission (in the case of the master station) in accordance with a control program stored in a program memory 11. A line connection determination circuit 12 determines input/output (receive and send) connection states in a self or remote station and duplex loop lines LA and LB under the control of the microprocessor 10. A line connection circuit 13 switches connections of the lines LA and LB in response to a command signal from the line connection determination circuit 12. An I/O circuit 14 is connected to the line connection circuit 13 to control input-/output of data (message) exchanged between the lines LA and LB. The I/O circuit 14 has a serial-parallel data conversion section, a high-speed input/output (receive and send) data buffer and so on, and has a data receive function section controlled by a common address. The detailed arrangement of the I/O circuit 14 is shown in FIG. 6.

Figure 6:
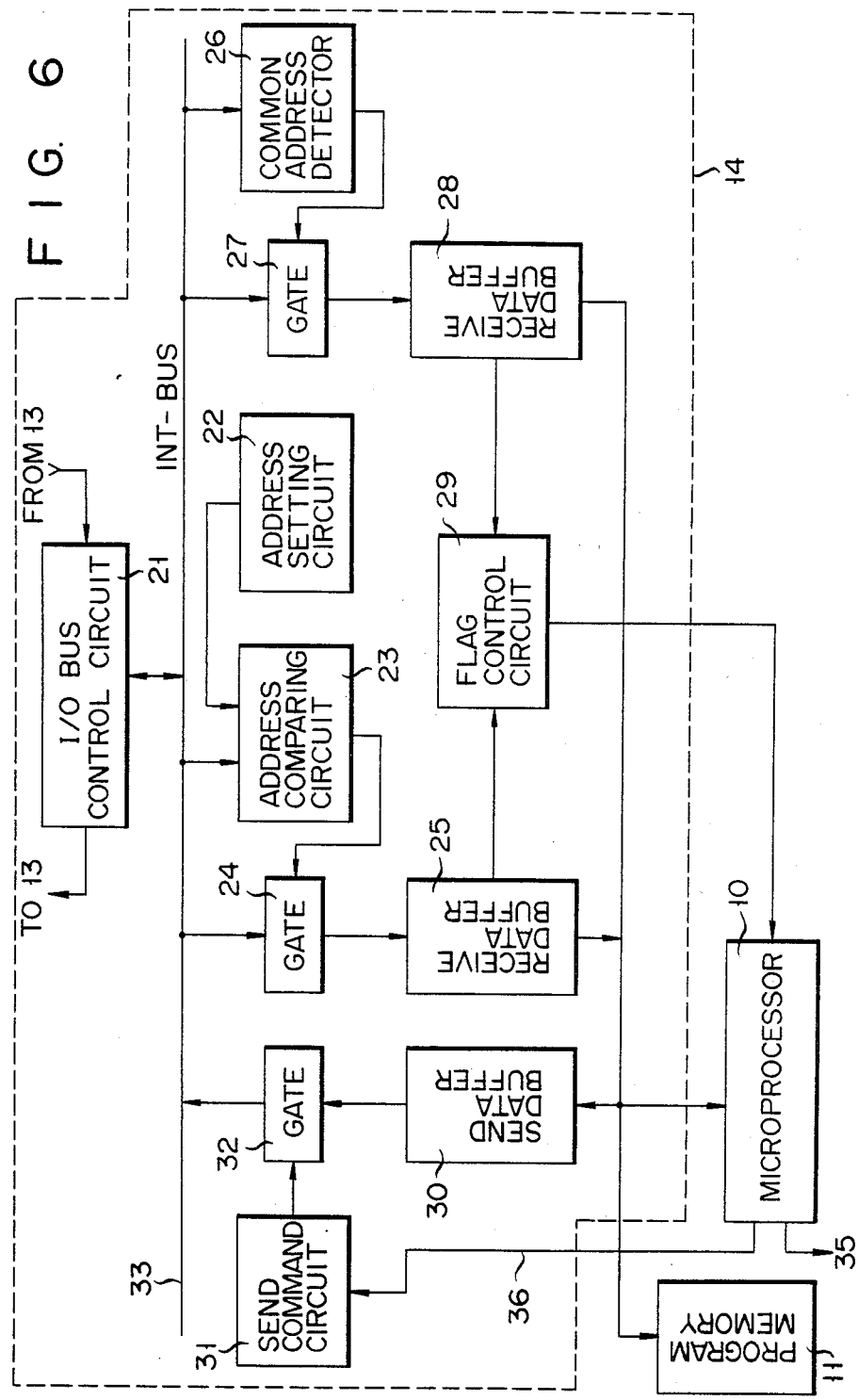
FIG. 6 is a block diagram showing the detailed arrangement of an input/output circuit of the station shown in FIG. 5.

Referring to FIG. 6, an I/O bus control circuit 21 has a serial-parallel data conversion function and controls data input/output between an internal high-speed input-/output bus (INT-BUS) 33 and the lines LA and LB connected to the line connection circuit 13. An address setting circuit 22 sets a self station address. An address comparing circuit 23 compares the self station address supplied from the address setting circuit 22 with an address supplied through the I/O bus control circuit 21 and the INT-BUS 33. A coincidence signal from the address comparing circuit 23 enables a first receive gate 24, so that the input (receive) data (to be described in detail with reference to the data format of FIG. 7A) on the INT-BUS 33 is received by a first receive data buffer 25. In normal operation wherein no fault occurs in the lines LA and LB and stations, data having the format in FIG. 7A is received by the first receive data buffer 25.

Figure 1:
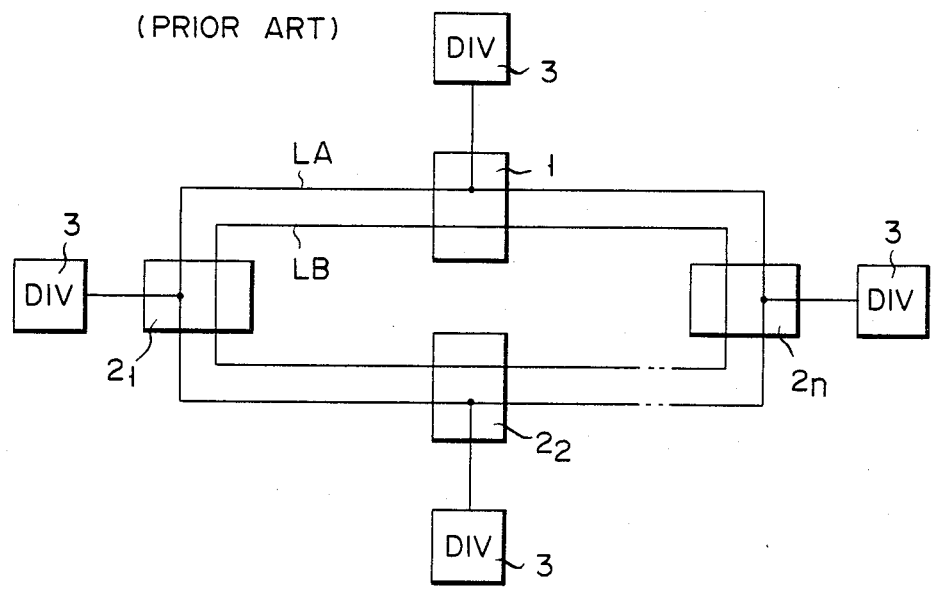
FIG. 1 is a block diagram showing the configuration of a general duplex loop transmission system.
Figure 2:
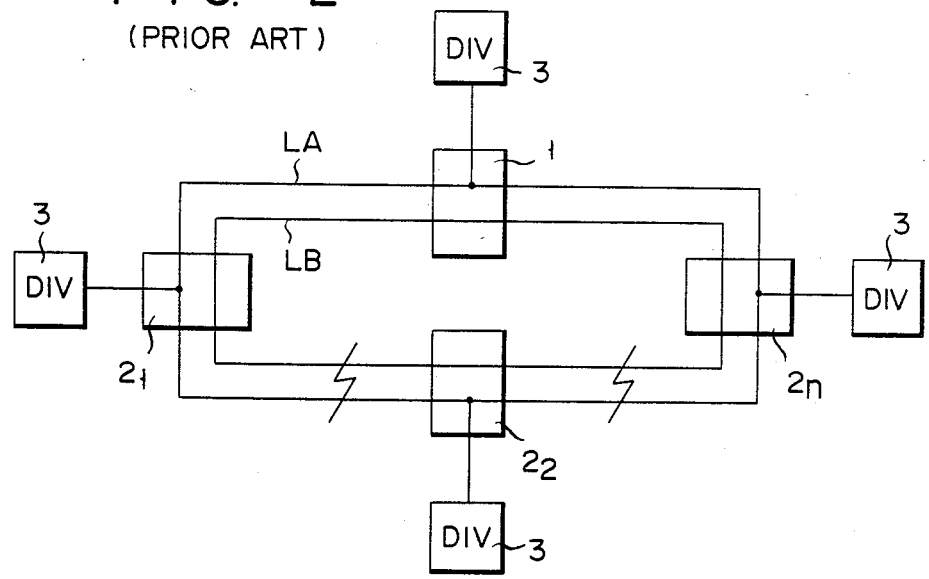
FIG. 2 is a block diagram showing a state wherein line trouble occurs in the system shown in FIG. 1.
Figure 3:
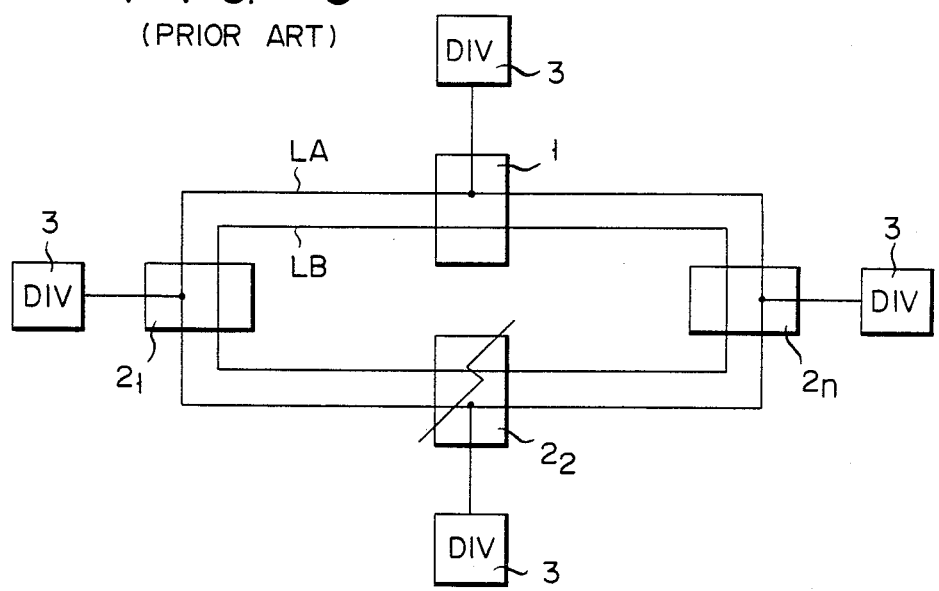
FIG. 3 is a block diagram showing a state wherein station trouble occurs in the system shown in FIG. 1.

A common address detector 26 detects a specific address (to be referred to as a common address which will be described in detail in FIG. 7B) common to the remote stations (corresponding to $2_1, 2_2, \ldots,$ and $2_n$ of FIG. 1). An address detection signal from the common address detector 26 enables a second receive gate 27, so that the input (receive) data (having the format shown in FIG. 7B) on the INT-BUS 33 is received by a second receive data buffer 28. However, when a fault occurs in the lines LA and LB or a station, a remote station S to be reconstructed causes the receive data buffer 28 of each station to receive the data having the format of FIG. 7B. A flag control circuit 29 performs priority interrupt operation in accordance with the data input states of the first and second receive data buffers 25 and 28 under the control of the microprocessor 10. A send data buffer 30 stores data to be sent in accordance with a control signal from the microprocessor 10. A send command circuit 31 enables a send gate 32 in response to a control signal from the microprocessor 10 and sends data from the send data buffer 30 onto the INT-BUS 33.

Figure 7A:
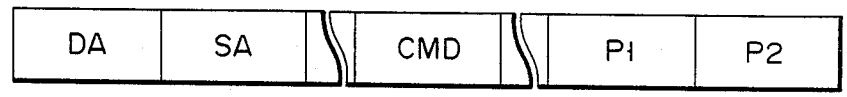

FIG. 7A shows the data format of exchange data between the remote stations. Reference symbol DA denotes a destination address; SA, a second address; CMD, a line control command; and P1 and P2, first and second parameters, respectively. In normal operation (i.e., no fault occurring in the lines LA and LB, or in a station), data is sent onto the INT-BUS 33 in this data format. The send data is received by the receive date buffer 25.

Figure 7B:
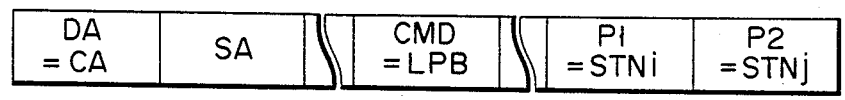

FIG. 7B shows the data format of data to be sent from the master station 1 to the remote station S to be reconstructed when a fault occurs. In this case, a common address CA is accessed as the destination address DA to each remote station. In addtion, the loop back command is accessed as the line control command CMD. An address (P1=SNTi) of the remote station which forms a return path (corresponding to the return path at the remote station $2_1$ of FIG. 4) from the line LA to the line LB is used as the first parameter. An address (P2=SNTj) of the remote station which forms a return path (corresponding to the return path at the remote station $2_n$ of FIG. 4) from the line LB to the line LA is used as the second parameter.

Figure 4:
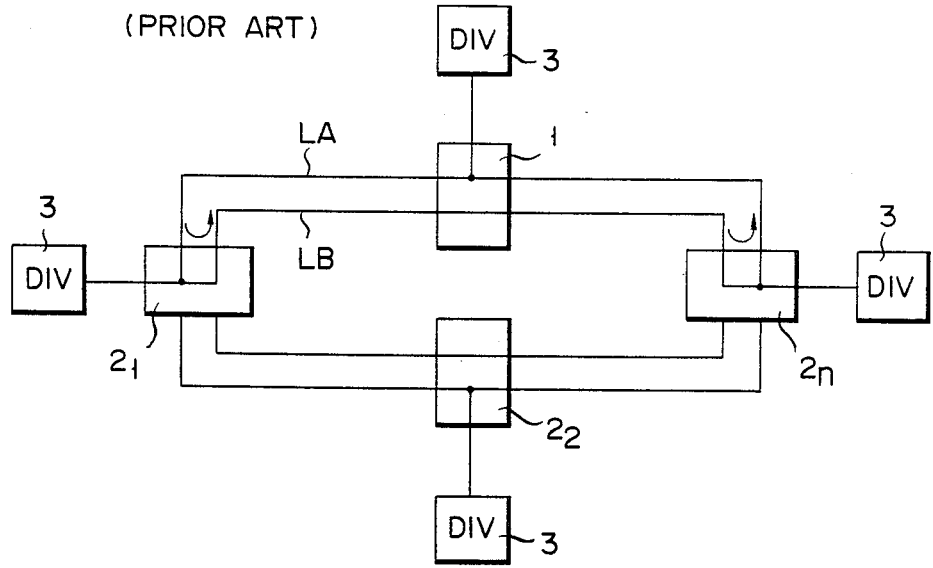
FIG. 4 is a block diagram showing the system configuration when data path reconstruction is performed by a loop back function upon occurrence of the faults in FIGS. 2 and 3.

The loop back command operation upon occurrence of a fault will be described with reference to the flow chart of FIG. 8. For illustrative convenience, the looped back configuration shown in FIG. 4 is also referred to.

In order to reconstruct the data way by means of the loop back function, the microprocessor 10 in the master station 1 has the send data buffer 30 for storing data having the format shown in FIG. 7B. More specifically, the common address CA is specified as the destination address, the loop back mode LPB is specified as the command CMD, and loop back command data whose station numbers are specified by the parameters P1 and P2 are set in the send data buffer 30. The send command circuit 31 in the master station 1 enables the send gate 32 in reponse to a control signal 36 from the microprocessor 10. As a result, the loop back command data (FIG. 7B) from the send data buffer 30 is sent onto the INT-BUS 33. Thereafter, the loop back command data is supplied to the I/O bus control circuit 21 in the master station 1 and is subjected to parallel-serial conversion. The serial data is then sent onto the lines LA and LB through the line connection circuit 13. The data is then sent to the remote stations $2_1, 2_2, \ldots,$ and $2_n$ within the loop through the lines LA and LB. In this case, the remote stations $2_1, 2_2, \ldots,$ and $2_n$ that receive the loop back command data from the master station 1 perform the processing shown in the flow chart of FIG. 8.

Since the destination address DA is the common address, the I/O circuits 14 of the remote stations $2_1, 2_2, \ldots,$ and $2_n$ perform the following operation. Each command address detector 26 detects the common address transferred through the corresponding INT-BUS 33 and generates a common address detection signal. The second receive gate 27 is enabled in response to the common address detection signal, so that the loop back command data (FIG. 7B) is stored in the second receive data buffer 28. This loop back command data is then fetched by the microprocessor 10 which discriminates the content of the fetched data (step 55). In step 56, the microprocessor 10 determines whether or not the line control command CMD of the loop back command data is the loop back command (CMD=LPB). If YES in step 56, the microprocessor 10 determines whether or not the first parameter P1 coincides with the self station address in step 58. If YES in step 58, the microprocessor 10 sends a command to the line connection determination circuit 12 which controls the line connection circuit 13 such that the line LA is the input line and the line LB is the output line. As a result, the loop switching (formation of the return path at the station $2_1$ of FIG. 4) of the line LA and line LB is performed.

For example, steps 55 and 56 are performed in the remote station $2_n$. If NO in step 58 (i.e., when the microprocessor 10 determines that the first parameter P1 does not coincide with the self station address), the microprocessor 10 determines in step 60 whether or not the second parameter P2 coincides with the self station address. If YES in step 60, line connections are performed by the line connection determination circuit 12 such that the line LB is the input line and the line LA is the output line under the control of the microprocessor 10 in step 61. As a result, the return path (corresponding to the return path at the station $2_n$ in FIG. 4) from the line LB to line LA is formed (step 61). However, if NO in step 60 (i.e., when the microcomputer 10 determines that the second parameter P2 does not coincide with the self station address), the line connection determination circuit performs, in step 62, normal line connections such that the line LA is the input line and the line LB is bypassed.

In this manner, two remote stations are accessed by the same loop back command data and subjected to line switching to form a return path, in accordance with loop back command data accessed from the master station by the common address. The lines LA and LB are simultaneously loop-back controlled in accordance with the data send direction, so that high-speed loop back switching connections can be performed for the maximum number of remote stations involved in data transmission. Therefore, real-time line reconstruction between the computers or the computer and the terminal device of the remote stations can be performed under proper protocol. Even if line reconstruction is performed, the entire operation of the data way system is not influenced and can be continuously performed.

What is claimed is:

1. A loop back control system in a loop data transmission system which has a master station looped serially with a plurality of remote stations through first and second duplex transmission lines, and which has a loop back function for performing data exchange between terminal devices connected to said remote stations through said first and second duplex transmission lines, comprising:

means for simultaneously sending common loop back command data from said master station to said first and second duplex transmission lines upon occurrence of a fault, the common loop back command data having a destination address field for setting a common address for said plurality of remote stations, a command field which is set in a loop back mode, a first parameter field for setting a remote station address subjected to loop back switching from said first duplex transmission line to said second duplex transmission line, and a second parameter field for setting a remote station address subjected to loop back switching from said second duplex transmission line to said first duplex transmission line.

2. A system according to claim 1, wherein each of said plurality of remote stations comprises:

loop back command data receiving means for receiving the loop back command data which is sent by said loop back command data sending means;

loop back command data determining means for determining the destination address and the first and second parameter fields of the loop back command data received by said loop back command data receiving means; and line connecting means for connecting said duplex transmission lines to construct a loop back path when said loop back command data determining means determines that the remote station address is detected in the first or second parameter fields while the common address is detected in the destination address field.

3. A system according to claim 2, wherein said line connecting means connects said first duplex transmission line to an input of the remote station and said second duplex transmission line to an output of said remote station when said loop back command data determining means determines that the first parameter field indicates the remote station address, connects said second duplex transmission line to said input of said remote station and said first duplex transmission line to said output of said remote station when said loop back command data determining means determines that the second parameter field indicates the remote station address, and connects one of said first and second duplex transmission lines to said input of said remote station and the other of said first and second duplex transmission lines when said loop back command data determining means determines that neither of the first and second parameter fields indicates the remote station address.

* * * * *